J. SCHAFFER.

Eyeglass.

No. 9,460. Reissued Nov. 9, 1880.

Attest.

Charles Pickles

H. Y. D. Dopp

Inventor.

John Schaffer by C. D. Moody atty.

UNITED STATES PATENT OFFICE.

JOHN SCHAFFER, OF ST. LOUIS, MISSOURI.

EYEGLASSES.

SPECIFICATION forming part of Reissued Letters Patent No. 9,460, dated November 9, 1880.

Original No. 228,399, dated June 1, 1880. Application for reissue filed September 11, 1880.

*To all whom it may concern:*

Be it known that I, JOHN SCHAFFER, of St. Louis, Missouri, have made a new and useful Improvement in Eyeglasses, of which the following is a full, clear, and exact description, reference being had to the annexed drawings, making part of this specification, in which—

Figure 1:
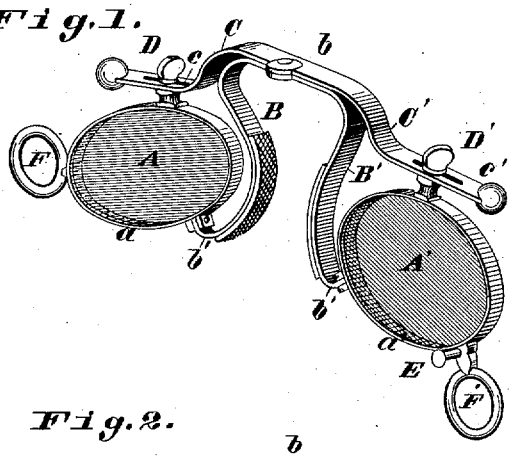
Figure 2:
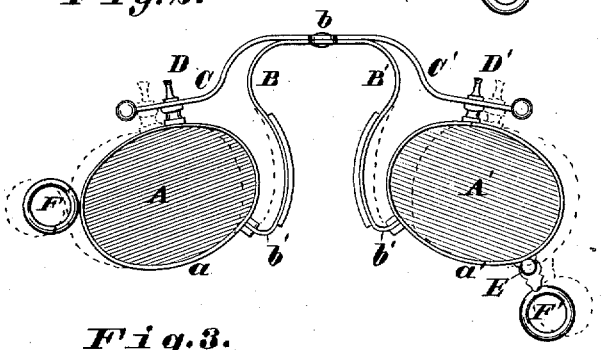
Figure 3:
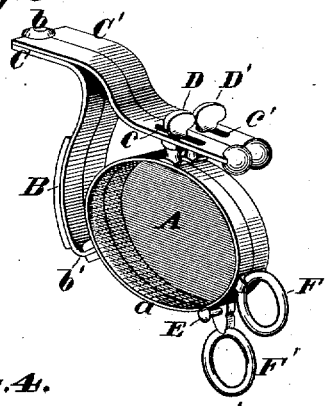

Figure 1 is a view, in perspective, of the improved eyeglasses; Fig. 2, a side elevation; Fig. 3, a perspective view, showing the glasses folded; and Fig. 4, a top view of the glasses, showing them slightly inclined to each other.

The same letters denote the same parts.

This invention relates partly to the folding of the glasses, partly to the frame-work that unites and holds the glasses, and partly to the means for adjusting them to noses of different sizes.

Referring to the drawings, A A′ represent the glasses proper, which, with the bows *a a′*, are of the usual construction. The connecting-bridge, however, in place of being a single piece, is made in two parts, B B′, which are hinged together at *b*, enabling the glasses to fold horizontally together—that is, when opened the glasses are in the position shown in Figs. 1, 2; but to close them they are turned horizontally upon the hinge *b* and brought into the position shown in Fig. 3, enabling the glasses to be folded without straining the hinge or any part of the frame-work connecting the glasses, and without scratching the glasses.

The bridge is extended and attached to the glasses near the lower edges thereof—viz., at the points *b′ b′*.

C C represent a brace hinged at *b*, and extending thence over the tops of the bows *a a′*, and having the slots *c c′*, and being connected with the bows by means of the set-screws D D′. The braces aid in connecting the glasses, but are designed also for adjusting them to noses of different sizes, to which end the screws D D′ are loosened, allowing them to move in the slots *c c′*, and enabling the glasses to be brought nearer together or to be opened farther apart, as indicated by the dotted lines in Fig. 2, and when properly adjusted the screws are tightened.

Figure 4:
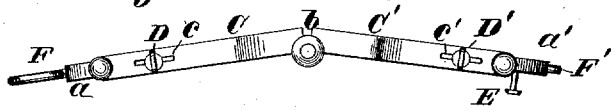

The bridge B B′, as well as the brace C C′, is of springy material, and by reason of this, and of the bridge being connected with the glasses at or near the lower edges thereof, the relative adjustment of the glasses can be effected without straining any part. The glasses can be fastened in a folded form by means of the catch E. The glasses are also furnished with the eyes or handles F F′. The folding feature of the glasses also enables them to be inclined to each other, as shown in Fig. 4, and be worn in that form.

I claim—

1. The combination of the folding glasses A A′, bridge B B′, hinged at *b*, the slotted and hinged braces C C′, and the set-screws D D′, substantially as described.

2. The combination of the folding glasses A A′, the bridge B B′, hinged at *b* and attached to the glasses at *b′ b′*, the slotted and hinged braces C C′, and the set-screws D D′, substantially as described.

3. The glasses A A′, united by a folding nose-bridge and also by the folding brace C C′.

4. The combination of the folding glasses A A′, brace C C′, and bridge B B′, said bridge being united both to the glasses and to the brace.

5. The combination of the folding glasses A A′, brace C C′, and bridge B B′, said bridge being united both to said glasses and said brace, and said bridge and brace being hinged at *b*.

6. The combination of the folding glasses A A′, brace C C′, and bridge B B′, said brace and bridge being hinged at *b*, and said brace being connected with said glasses at the tops thereof, and said bridge being connected with said glasses at or near the bottoms thereof, substantially as described.

JOHN SCHAFFER.

Witnesses:

C. D. MOODY,

CHARLES PICKLES.